United States Patent Office 3,849,563
Patented Nov. 19, 1974

3,849,563
N-ALKANOYL-N-[1 - (HETEROCYCLIC AMINO) ISOPROPYL] - 2 - AMINOPYRIDINES IN THE TREATMENT OF PAIN
Rudolf Hiltmann, Hartmund Wollweber, and Friedrich Hoffmeister, Wuppertal-Elberfeld, and Hans-Gunther Kroneberg, Wuppertal-Vohwinkel, Germany, assignors to Bayer Aktiengesellschaft
No Drawing. Application Dec. 27, 1971, Ser. No. 212,749, now Patent No. 3,773,771, which is a continuation-in-part of applications Ser. No. 82,838, Oct. 21, 1970, and Ser. No. 113,053, Feb. 5, 1971, Ser. No. 82,838 being a continuation-in-part of application Ser. No. 761,795, Sept. 23, 1968, and Ser. No. 113,053 being a continuation of application Ser. No. 761,323, Sept. 20, 1968, all now abandoned. Divided and this application May 7, 1973, Ser. No. 357,728
Claims priority, application Germany, Sept. 25, 1967, F 53,580, F 53,582
Int. Cl. A61k 27/00
U.S. Cl. 424—263
16 Claims

ABSTRACT OF THE DISCLOSURE

N - (Lower alkanoyl) - N - [1 - (heterocyclic amino)-isopropyl] - 2 - aminopyridines in which the heterocyclic amino group is a 2- or 3-methylpiperidino group optionally bearing a second methyl group in the 2-, 3- or 5-position or hexahydroazepin - 1 - yl optionally bearing one or two methyl groups in the 2- and/or 3-position, are analgesic agents. The compounds, of which N - propionyl-N - [1 - (2 - methylpiperidino)isopropyl] - 2 - aminopyridine is a representative embodiment, are prepared through acylation of the corresponding N - [1 - (heterocyclic amino)isopropyl] - 2 - aminopyridine with a lower alkanoic acid halide.

CROSS-REFERENCE

This is a divisional of Serial No. 212,749, now U.S. Pat. No. 3,773,771, which is a continuation-in-part of applications Ser. No. 82,838, Oct. 21, 1970, and Ser. No. 113,053, Feb. 5, 1971. Ser. No. 82,838 being a continuation-in-part of Ser. No. 761,795, Sept. 23, 1968, and Ser. No. 113,053 being in turn a continuation of Ser. No. 761,323, Sept. 20,1968, all are now abandoned.

Detailed Description

The present invention pertains to pyridine derivatives of the formula:

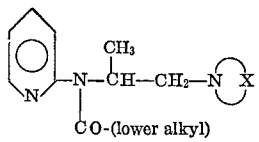

wherein X is a methyl substituted pentamethylene, hexamethylene or methyl substituted hexamethylene chain having a total of from 6 to 8 carbon atoms.

In addition, the invention also pertains to the pharmaceutically acceptable acid addition salts of the pyridine derivatives of Formula I.

In the above definitions and throughout the present specification and claims, the term "(lower alkyl)" denotes a straight or branched monovalent saturated hydrocarbon group of from 1 to 4 carbon atoms. Thus included are methyl, ethyl, n-propyl isopropyl, n-butyl, isobutyl, sec.-butyl, and tert.-butyl. Methyl and ethyl are preferred.

The compounds of Formula I and their pharmaceutically acceptable acid addition salts exhibit analgesic effects in animals and humans and are thus useful in the treatment of pain. The compounds are effective at low dosages and demonstrates low toxicities so that they are, as compared with prior art compounds of related structure, either analgetically more potent with comparable therapeutic indices or analgetically equipotent with superior therapeutic indices.

The singular properties of these compounds appears to be closely related with the nature of the alkylene chain. Thus X is preferably the 2 - methyl - 1,5-pentalene, 2,2 - dimethyl - 1,5 - pentalene, 2,4 - dimethylpentalene, 1,5 - hexalene, 2 - methyl - 1,5 - hexalene, 4-methyl - 1,5 - hexalene, 1,6 - hexalene, 2 - methyl - 1,6-hexalene, 2,2 - dimethyl - 1,6 - hexalene, 1,6 - heptalene, or 6 - methyl - 1,6 - heptalene chain. It will be observed that these preferred chains, when taken together with the nitrogen atom to which they are attached, correspond to either (a) a 2- or 3-methylpiperidino group optionally bearing a second methyl substituent in the 2-, 3- or 5-position or (b) a hexahydroazepin - 1 - yl group optionally bearing one or two methyl groups in the 2- or 3-position.

The compounds of the present invention are prepared through acylation of a pyridine derivative of the formula:

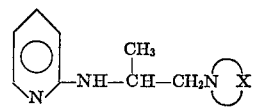

wherein X is as above defined, with a lower alkanoic acid halide or lower alkanoic acid anhydride, optionally in the presence of an inert organic solvent such as chloroform or methylene chloride. The requisite starting materials of Formula II may be obtained through treatment of 2-aminopyridine with the N-(α-bromopropionyl) derivative of the heterocyclic amine followed by reduction as with lithium aluminum hydride or through treatment of the N-(2-aminopropyl) derivative of the heterocyclic amine with 2-bromopyridine.

The N-alkanoyl compounds obtained as a result of the synthesis of the present invention are oils and can be distilled in vacuum to form water-soluble salts with non-toxic pharmacologically unobjectionable inorganic acids. Suitable acids for such use are hydrochloric acid, sulphuric acid, ntiric acid, phosphoric acid, methanesulphonic acid and organic acids such as fumaric acid, tartaric acid, succinic acid, citric acid, glutaric acid and the like.

The new compounds contain at least one center of asymmetry and therefore form racemates which can be separated into their enantiomers by known methods. When more than one center of asymmetry is present diastereomeric mixtures of racemates result, the components of which can be isolated by known procedures such as, for example, fractional crystallization, fractional distillation, distributive chromatography and the like. The respective diastereomer racemates are herein arbitrarily designated as A and B.

The separation of enantiomers and of diastereomers can be carried out as the final step or in the course of the chemical synthesis.

The compounds of the present invention are more effective analgetic agents than prior art compounds of related structure, possessing greater analgetic potency with comparable therapeutic indices or equivalent analgetic potency with superior therapeutic indices. This can be seen from the following data comparing the pharmacological properties of various N-propionyl compounds of the present invention with, for example, N-propionyl - 2 - (1-piperidino-isopropyl)aminopyridine described in U.S. Pat. No. 3,163,654.

TABLE I

| Compound number | | Ex. | ED50 |
|---|---|---|---|
| 1 | Piperidino | Known | 9.27 |
| 2 | 2-methylpiperidino | 1 | 5.89 |
| 3 | 3-methylpiperidino | 7 | 4.68 |
| 4 | Trans-2,3-dimethylpiperidino | 9 | 5.50 |
| 5 | Trans-2,5-dimethylpiperidino (A) | 10 | 6.13 |
| 6 | Trans-2,5-dimethylpiperidino (B) | 10 | 4.16 |
| 7 | Cis-2,5-dimethylpiperidino (A) | 11 | 5.47 |
| 8 | Cis-2,5-dimethylpiperidino (B) | 11 | 2.98 |
| 9 | 3,3-dimethylpiperidino | 2 | 0.98 |
| 10 | Cis-3,5-dimethylpiperidino | 8 | 4.27 |

The toxicities of the foregoing compounds, as determined upon subcutaneous administration to rats, are as follows:

TABLE II

| Compound No. | LD50 |
|---|---|
| 1 | 366(320–415) |
| 2 | 203(187–222) |
| 3 | 182.6(151.1–257.3) |
| 4 | 160.0(137.7–188.7) |
| 5 | 139.2(119.0–167.6) |
| 6 | ~125 |
| 7 | 215(198–234) |
| 8 | 200(160–250) |
| 9 | 79.7(68.1–99.9) |
| 10 | 180(122–243) |

The analgesic effectiveness of the corresponding compounds in which X taken together with the nitrogen atom to which it is attached is a hexahydroazepinyl ring is demonstrated by the following:

TABLE III

| Compound number | | Ex. | ED50 |
|---|---|---|---|
| 11 | Hexahydroazepinyl | 12 | 12.0 |
| 12 | 2-methylhexahydroazepinyl | 6 | 2.84 |
| 13 | 2,2-dimethylhexahydroazepinyl | 15 | 4.16 |
| 14 | 3-methylhexahydroazepinyl | 16 | 6.00 |
| 15 | 3,3-dimethylhexahydroazepinyl | 17 | 4.69 |

The toxicities of these compounds are as follows:

TABLE IV

| Compound No. | LD50 |
|---|---|
| 11 | 420(385–458) |
| 12 | 126.9(75.1–170.5) |
| 13 | 159.2(132.5–183.6) |
| 14 | 195(167–228) |
| 15 | 82(68–99) |

In view of the analgesic properties, these compounds are useful in the treatment of pain such as is encountered in postoperative, postpartum and traumatic conditions, arthritis, cephalalgia, bursitis and the like. They may be administered alone, or in combination wth other agents such as aspirin, phenacetin, caffeine and the like. Administration, either alone or in combination with other agents is accomplished by the oral or parenteral routes in the usual pharmaceutical formulations such as tablets, capsules, suspensions, aqueous solutions and the like. The dose of these compounds must in every case be individualized in view of the species, age, weight and the particular condition being treated.

The compounds of the present invention are incorporated in compositions suitable for oral administration to animals in solid and liquid unit dosage forms, such as tablets, capsules, powders, granules, syrups, suspensions, solutions and the like. The term unit dosage form as used in this specification and claims refers to physically discrete units suitable as unitary dosages for animals, each unit containing a predetermined quantity of active material calculated to produce the desired therapeutic effect in association with the required pharmaceutical diluent, carrier or vehicle.

Powders are prepared by comminuting a compound of this invention to a suitably fine size and mixing with a similarly comminuted diluent. The diluent can be an edible carbohydrate material such as starch. A sweetening agent or sugar may also be present as well as flavoring oil.

Capsules are made by preparing a powder mixture as described above and filling formed gelatin sheaths. As an adjuvant to the filling operation, a lubricant such as talc, magnesium stearate and calcium stearate may be added to the powder mixture before the filling operation.

Tablets are made by preparing a powder mixture, granulating or slugging, adding a lubricant and pressing into tablets. The powder mixture is prepared by mixing the compound, suitably comminuted, with a diluent or base such as starch, sucrose, kaolin, dicalcium phosphate and the like. The powder mixture can be granulated by wetting with a binder such as syrup, starch paste or acacia mucilage and forcing through a screen. As an alternative to granulating, the powder mixture can be slugged, i.e., run through the tablet machine and the resulting imperfectly formed tablets broken into pieces or slugs. The slugs can be lubricated to prevent sticking to the tablet forming dies by means of the addition of stearic acid, a stearate salt, talc or mineral oil. The lubricating mixture is then compressed into tablets. A protective coating consisting of a sealing coat of shellac, a coating of sugar and methylcellulose, and a polish coating of carnauba wax may be provided.

For parenteral administration, fluid unit dosage forms can be prepared by dissolving or suspending a measured amount of the compound in an aqueous medium or a nontoxic suspending agent suitable for injection.

The following examples will serve to further typify the nature of this invention without being a limitation on the scope thereof.

Example 1

A solution of 27.4 g. of N-[1-(2-methyl-piperidino)-isopropyl] - 2 - aminopyridine in methylene chloride is added dropwise at 0–10° C., while cooling with ice, to 12 g. of propionyl chloride in methylene chloride, the mixture is stirred for a further half hour, and the solvent is removed in a vacuum at a temperature below 40° C. The residue is dissolved in water, extracted several times with ether, and the base is precipitated from the aqueous solution with a sodium hydroxide solution. The product is taken up with ether and the ethereal solution dried with potassium carbonate. After driving off the solvent, the residue is purified by distillation in a vacuum, 22.4 g. of N-propionyl - N - [1-(2-methyl-piperidino)-isopropyl]-2-aminopyridine being obtained in the form of a yellowish oil of b.p. 153–155° C./0.3 mm. Hg.

The N-[1-(2-methyl - piperidino)-isopropyl]-2-aminopyridine (b.p. 132–136° C./0.3 mm. Hg) is prepared by reacting 2-methyl-piperidine with chloroacetone, catalytically reducing the resultant 1-(2-oxopropyl) - 2 - methylpiperidine (b.p. 88° C./10 mm. Hg) in the presence of ammonia and ammonium acetate by means of hydrogen and Raney cobalt, and heating the resultant 1-(2-aminopropyl) - 2 - methyl-piperidine (b.p. 83–84° C./10 mm. Hg) with 2-bromopyridine in the presence of copper bronze and potassium carbonate.

Example 2

By the method described in Example 1 there is obtained from 33 g. of N-[1-(3,3-dimethyl-piperidino)-isopropyl]-2-aminopyridine (b.p. 136° C./0.1 mm. Hg) and 13.6 g. of propionyl chloride, 29.8 g. of N-propionyl-N-[1-(3,3-dimethyl-piperidino)-isopropyl] - 2 - aminopyridine of b.p. 156–160° C./0.1 mm. Hg.

The starting material is prepared by reacting 3,3-dimethyl-piperidine with chloroacetone to form the aminoketone (b.p. 92–93° C./10 mm. Hg), catalytically reducing the latter in the presence of ammonia, and heating the resultant diamine (b.p. 84° C./10 mm. Hg) with 2-bromopyridine.

Example 3

30 g. of N-[1-(3,3-dimethyl-piperidino) - isopropyl]-2-aminopyridine and 50 ml. of acetic acid anhydride are heated at 120° C. for 8 hours, the mixture is then concentrated by evaporation in a vacuum and the residue taken up with water. The base is precipitated from the solution with a sodium hydroxide solution, the product is taken up with ether and dried with potassium carbonate. After driving off the solvent, the mixture is distilled in a vacuum and there are obtained 25.5 g. of N-acetyl-N-[1-(3,3 - dimethyl-piperidino)-isopropyl]-2-aminopyridine of b.p. 151–153° C./0.1 mm. Hg).

Example 4

By the method described in Example 3 there is obtained, from 30 g. of N-[1-(3,3-dimethyl-piperidino)-isopropyl) - 2 - aminopyridine and 50 ml. of propionic acid anhydride, 28.1 g. of the N-propionyl - N - [1-(3,3-dimethyl-piperidino)-isopropyl] - 2 - aminopyridine of b.p. 156–160° C./0.1 mm. Hg described in Example 4.

Example 5

By the method described in Example 3 there is obtained from 30 g. of N-[1-(3,3-dimethyl-piperidino)-isopropyl]-2-aminopyridine and 60 g. of valerianic acid anhydride, 31.5 g. of N-valeryl-N-[1-(3,3-dimethyl - piperidino)-isopropyl] - 2 - aminopyridine of b.p. 180–183° C./0.05 mm. Hg.

Example 6

By the method described in Example 1 there is obtained from 30 g. of N-[1-(2-methyl-hexahydroazepin - 1 - yl)-isopropyl]-2-aminopyridine (b.p. 149–150° C./0.2 mm. Hg) and 12.5 g. of propionyl chloride, 27.9 g. of N-propionyl - N - [1-(2-methyl-hexahydroazepin - 1 - yl)-isopropyl]-2-aminopyridine of b.p. 164–166° C./0.2 mm. Hg.

The starting material is prepared by reacting 2-methyl-hexahydroazepine with chloroacetone to form the aminoketone (b.p. 93–95° C./11 mm. Hg), catalytically reducing the latter in the presence of ammonia, and heating the resultant diamine (b.p. 88–90° C./11 mm. Hg) with 2-bromopyridine.

Example 7

By the method described in Example 1 there is obtained, from 38 g. N-[1-(3-methyl-piperidino) - isopropyl] - 2-aminopyridine (b.p. 130–133° C./0.3 mm. Hg) and 16.6 g. propionyl chloride, 33.5 g. N-propionyl-N-[1-(3-methyl-piperidino) - isopropyl]-2-aminopyridine of b.p. 146–148° C./0.3 mm. Hg.

The starting material is prepared by reacting 3-methyl-piperdine with chloroacetone to form aminoketone (b.p. 88–90° C./12 mm. catalytically reducing the latter in the presence of ammonia and heating the resultant diamine (b.p. 82–84° C./11 mm. Hg) with 2-bromopyridine.

Example 8

By the method described in Example 1 there is obtained, from 67.1 g. N-[1-(cis-3,5-dimethyl-piperidino) - isopropyl]-2-aminopyridine (b.p. 144–148° C./0.5 mm. Hg) and 29.1 g. propionyl chloride, 74.5 g. N-propionyl-N-[1-(cis-3,5-dimethyl-piperidino) - isopropyl] - 2 - aminopyridine hydrochloride of m.p. 175–176° C. (after recrystallization from methylene chloride/ether).

The starting material is prepared by reacting cis-3,5-dimethyl-piperidine (m.p. of picrate 184–186° C.) with chloroacetone to form the aminoketone (b.p. 94–95° C./13 mm. Hg), catalytically reducing the latter in the presence of ammonia, and heating the resultant diamine (b.p. 89–92° C./15 mm. Hg) with 2-bromopyridine.

Example 9

By the method described in Example 1 there is obtained, from 43.8 g. N-[1-trans 2,3-dimethyl - piperidino) - isopropyl] - 2 - aminopyridine (b.p. 156–161° C./0.3 mm. Hg) and 19.3 g. propionyl chloride, 31.2 g. N-propionyl-N-[1-(trans 2,3-dimethyl-piperidino)-isopropyl]-2-aminopyridine of b.p. 171–178° C./0.6 mm. Hg.

The starting material is prepared by reacting trans 2,3-dimethyl-piperidine (obtainable by catalytic hydrogenation of 2,3-lutidine by means of a Ru/Al₂O₃ catalyst at 170° C./220 atm. excess presure, b.p. 60–63° C./51 mm. Hg) with chloroacetone to form the aminoketone (b.p. 93–95° C./11 mm. Hg), catalytically reducing the latter in the presence of ammonia, and heating the resultant diamine (b.p. 86–90° C./11 mm. Hg) with 2-bromopyridine.

Example 10

Following the procedure described in Example 1, 53 g. of N-[1-(trans-2,5-dimethylpiperidino) - isopropyl] - 2-aminopyridine (diastereomer A), b.p. 135–140° C./0.5 mm., and 22.2 g. of propionyl chloride yield 55.3 g. N-propionyl-N-[1 - (trans-2,5-dimethylpiperidino) - isopropyl]-2-aminopyridine (diastereomer A), m.p. 83–85° C. from petroleum ether.

Similarly, utilizing 27 g. of the N-[1-(trans-2,5-dimethylpiperidino)-isopropyl] - 2 - aminopyridine diastereomer B, b.p. 109–114° C./0.15 mm., and 11.3 g. propionyl chloride, 23.7 g. N-propionyl-N-[1-(trans-2,5-dimethyl-piperidino)-isopropyl]-2-aminopyridine (diastereomer B) of b.p. 143–150° C./0.2 mm. are obtained.

The starting materials are prepared by acylating trans-2,5-dimethyl-piperidine with α-chloropropionyl chloride and reacting the resulting mixture of N-α-chloropropionyl-trans - 2,5 - dimethylpiperidine diastereomers (b.p. 103–105°) with 2-aminopyridine. From the resulting mixture of N-[α-(2-pyridylamino)-propionyl] - cis - 2,5 - dimethylaminopiperidine diastereomers, fractional crystallization from ligroin serves to isolate diastereomer A of m.p. 135–137° and diastereomer B of m.p. 88–90°. Reduction of the two diastereomers yields two corresponding N - [1-(trans-2,5-dimethylpiperidino) - isopropyl] - 2 - aminopyridine diastereomers A (b.p. 125–140° C./0.3 mm.) and B (b.p. 109–114° C./0.15 mm.).

Example 11

Following the procedure described in Example 1, 14.7 g. N - [1-cis - 2,5 - dimethylpiperidino)-isopropyl] - 2-aminopyridine diastereomer A), b.p. 141–144° C./0.6 mm., and 6.8 g. propionylchloride yield 13.8 g. (N-propionyl-N-[1-(cis - 2,5 - dimethylpiperidino) - isopropyl]-2-aminopyridine (diastereomer A) of b.p. 160–170° C./0.5 mm.

Similarly from 1.8 g. of N-[1-(cis-2,5-dimethylpiperidino)-isopropyl] - 2 - aminopyridine diastereomer B and 0.87 g. propionyl chloride, 1.2 g. of N-propionyl-1-(cis-2,5-dimethylpiperidino) - isopropyl) - 2 - aminopyridine (diastereomer B) is obtained as an oil which is homogeneous upon gas chromatography and consistent in IR and NMR spectra.

The starting materials are prepared by acylating cis-2,5-dimethylpiperidine with α-chloropropionyl chloride and reacting the resulting mixture of N-α-chloropropionyl-cis-2,5-dimethylpiperidine diastereomers (b.p. 135–137° C./11 mm. with 2-aminopyridine. From the resulting mixture of N-[α-(2-pyridylamino) - propionyl] - cis - 2,5 - dimethylpiperidine diastereomers, fractional crystallization from ligroin yields diastereomer A of m.p. 116–117° C. and diastereomer B of m.p. 84–87° C. Reduction of the two diastereomers with lithium aluminum hydride yields two corresponding N-[1-(cis-2,5-dimethylpiperidino) - isopropyl]-2-aminopyridine diastereomers A (b.p. 141–144° C./0.6 mm.) and B. The latter, owing to the small quantities of substance, was merely tested by gas chromatography, and proved to be an entity and distinct from A.

Example 12

A solution of 30 g. of N-[1-(hexahydroazepin-1-yl)-isopropyl]-2-aminopyridine (b.p. 139–142° C./0.2 mm. Hg) in methylene chloride is added dropwise to 13.1 g. of propionyl chloride in 30 ml. of methylene chloride, the mixture is stirred for a further half hour, and the solvent is removed in a vacuum at a temperature below 40° C. The residue is dissolved in water, extracted again with ether, and the base is precipitated from the aqueous solution with a sodium hydroxide solution. The product is taken up with ether and the ethereal solution dried with potassium carbonate. After driving off the solvent, the residue is purified by distillation in a vacuum, 26 g. of N-propionyl-N-[1-(hexahydroazepin - 1 - yl) - isopropyl] - 2 - amino-pyridine of b.p. 162–164° C./0.2 mm. Hg being obtained in the form of a yellowish oil.

The starting material is prepared by reacting hexahydroazepine with chloroacetone to form the aminoketone (b.p. 94–95° C./11 mm. Hg), catalytically reducing the latter in the presence of ammonia and heating the resultant diamine (b.p. 90° C./11.5 mm. Hg) with 2-bromopyridine.

Example 13

30 g. of N-[1-(hexahydroazepin-1-yl)-isopropyl]-2-aminopyridine and 50 ml. of acetic acid anhydride are heated at 120° C. for 8 hours. The mixture is then concentrated by evaporation in a vacuum and the residue taken up in water. The base is precipitated from the solution with a sodium hydroxide solution, taken up with ether, and the ethereal solution is dried with potassium carbonate. After driving off the solvent, the mixture is distilled in a vacuum, 24.3 g. of N-acetyl-N-[1-(hexahydroazepin-1-yl)-isopropyl] - 2 - aminopyridine of b.p. 155–157° C./0.2 mm. Hg being obtained.

Example 14

By the method described in Example 13 there is obtained from 20 g. of N-[1-(hexahydroazepin-1-yl)-isopropyl]-2-aminopyridine and 40 ml. of propionic acid anhydride, 19.8 g. of the N-propionyl-N-[1-(hexahydroazepin-1-yl)-isopropyl]-2-aminopyridine of b.p. 162–164° C./0.2 mm. Hg.

Example 15

By the method described in Example 1 there is obtained from 5.0 g. of N-[1-(2,2-dimethylhexahydroazepin-1-yl)-isopropyl]-2-aminopyridine (b.p. 138° to 142° C./0.2 mm. Hg) and 3.6 g. of propionyl chloride, 4.9 g. of N-propionyl-N-[1(2,2-dimethylhexahydroazepin-1-yl)-isopropyl]-2-aminopyridine of b.p. 168° to 172° C./0.15 mm. Hg.

The starting material can be prepared by Beckmann rearrangement of 2,2-dimethylcyclohexanonoxime (m.p. 91° C.) to form the 2,2-dimethyl-7-oxohexahydroazepine (b.p. 125 to 150° C./11 mm. Hg), reducing the latter with lithium aluminum hydride and acylating the 2,2-dimethylhexahydroazepin thus formed (b.p. 155° C.; picrate, m.p. 214° to 215° C.) with α-bromopropionyl chloride to yield α-bromopropionyl-2,2-dimethylhexahydroazepin (b.p. 106° to 116° C./0.2 mm. Hg), with 2-aminopyridine to form N-[α-(2-pyridylamino)-propionyl]-2,2-dimethylhexahydroazepine (b.p. 72° to 75° C.) and reducing the latter with lithium aluminium hydride.

Example 16

Following the procedure described in Example 1, 15.0 g. N - [1-(3-methylhexahydroazepine-1-yl)-isopropyl]-2-aminopyridine, b.p. 130–132° C./0.2 mm., and 11.3 g. propionyl chloride yield 12.9 g. N-propionyl-N-[1-(3-methylhexahydroazepine-1-yl)-isopropyl] - 2 - aminopyridine, b.p. 150–154° C./0.1 mm.

The starting material is prepared by acylating 3-methylhexahydroazepin (b.p. 38° C./10 mm., picrate m.p. 96–97° C.) with α-bromopropionic acid bromide, reacting the resulting N-α-bromopropionyl-3-methylhexahydroazepine (b.p. 118–122° C./0.15 mm.) with 2-aminopyridine to N-[α-(2-pyridylamino)-propionyl]-3-methylhexahydroazepine (m.p. 90–91° C.) and reducing the latter with lithium aluminum hydride.

Example 17

Following the procedure described in Example 1, 15 g. N-[1-(3,3-dimethylhexahydroazepine-1-yl)-isopropyl]-2-aminopyridine (b.p. 133–135° C./0.15 mm.) and 10.6 g. propionyl chloride yield 13.8 g. N-propionyl-N-[1-(3,3-dimethylhexahydroazepine - 1 - yl) - isopropyl]-2-aminopyridine of b.p. 162–164° C./0.25 mm.

The starting material is prepared by hydrogenating α,α-dimethyl-adipic acid dinitrile (b.p. 101–102° C./0.5 mm.) with Raney cobalt and cyclizing the resulting 2,2-dimethylhexamethylenediamine (b.p. 95–99° C./12 mm.) through catalytic elimination of ammonia with aluminum oxide to yield 3,3-dimethylhexahydroazepine (b.p. 46–48° C./11 mm., picrate m.p. 163–165° C.). This product is acylated with α-bromopropionic acid bromide to yield N-α-bromopropionyl-3,3-dimethylhexahydroazepine (b.p. 104–111° C./0.1 mm.) which is reacted with 2-aminopyridine to N - [α-(2 - pyridylamino)-propionyl]-3,3-dimethylhexahydroazepine, m.p. 95–96° C., which in turn is reduced with lithium aluminum hydride.

What is claimed is:

1. A pharmaceutical composition useful for its analgesic effect comprising an analgesically effective amount of a compound selected from the group consisting of a 2-aminopyridine of the formula:

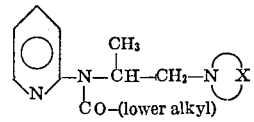

wherein X is a pentamethylene chain substituted by two methyl groups or a hexamethylene chain substituted by one or more or two methyl groups, and a pharmaceutically acceptable acid addition salt thereof, in combination with a pharmaceutically acceptable carrier.

2. A composition according to claim 1 wherein X is selected from the group consisting of 2,2-dimethyl-1,5-pentalene, 2,4-dimethyl-1,5-pentalene, 2-methyl-1,5-hexalene, 4-methyl-1,5-hexalene, 2-methyl-1,6-hexalene, 2,2-dimethyl-1,6-hexalene, 1,6-heptalene and 6-methyl-1,6-heptalene.

3. A composition according to claim 2 wherein said compound is N-propionyl-N-[1-(3,3-dimethylpiperidino)isopropyl]-2-aminopyridine.

4. A composition according to claim 2 wherein said compound is N-propionyl-N-[1-(3,5-dimethylpiperidino)isopropyl]-2-aminopyridine.

5. A composition according to claim 2 wherein said compound is N-propionyl-N-[1-(2,5-dimethylpiperidino)isopropyl]-2-aminopyridine.

6. A composition according to claim 2 wherein said compound is N-propionyl-N-[1-(2,3-dimethylpiperidino)isopropyl]-2-aminopyridine.

7. A composition according to claim 2 wherein said compound is N-propionyl-N-[1-(2-methylhexahydroazepin-1-yl)isopropyl]-2-aminopyridine.

8. A composition according to claim 2 wherein said compound is N-propionyl-N-[1-(2,2-dimethylhexahydroazepin-1-yl)isopropyl]-2-aminopyridine.

9. The method of treating pain in humans and animals which comprises orally or parenterally administering to said human or animal an analgesically effective amount of a compound selected from the group consisting of a 2-aminopyridine of the formula:

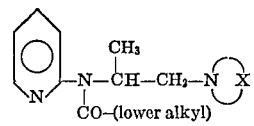

wherein X is a pentamethylene chain substituted by two methyl groups or a hexamethylene chain substituted by one or two methyl groups, and a pharmaceutically acceptable acid addition salt thereof.

10. The method according to claim 9 wherein X is selected from the group consisting of 2,2-dimethyl-1,5-pentalene, 2,4-dimethyl-1,5-pentalene, 2-methyl-1,5-hexalene, 4-methyl-1,5-hexalene, 2-methyl-1,6-hexalene, 2,2-dimethyl-1,6-hexalene, 1,6-heptalene and 6-methyl-1,6-heptalene.

11. The method according to claim 9 wherein the 2-aminopyridine is N-propionyl-N-[1-(3,3-dimethylpiperidino)isopropyl]-2-aminopyridine.

12. The method according to claim 9 wherein the 2-aminopyridine is N-propionyl-N-[1-(3,5-dimethylpiperidino)-isopropyl]-2-aminopyridine.

13. The method according to claim 9 wherein the 2-aminopyridine is N-propionyl-N-[1-(2,5-dimethylpiperidino)isopropyl]-2-aminopyridine.

14. The method according to claim 9 wherein the 2-aminopyridine is N-propionyl-N-[1-(2,3-dimethylpiperidino)isopropyl]-2-aminopyridine.

15. The method according to claim 9 wherein the 2-aminopyridine is N-propionyl-N-[1-(2-methylhexahydroazepin-1-yl)isopropyl]-2-aminopyridine.

16. The method according to claim 9 wherein the 2-aminopyridine is N-propionyl-N-[1-(2,2-dimethylhexahydroazepin-1-yl)isopropyl]-2-aminopyridine.

References Cited
UNITED STATES PATENTS

| | | | |
|---|---|---|---|
| 3,163,654 | 12/1964 | Hiltmann et al. | 260—293.69 |
| 3,594,477 | 7/1971 | Wollweber et al. | 260—293.69 |

STANLEY J. FRIEDMAN, Primary Examiner

U.S. Cl. X.R.

424—267